United States Patent Office 2,782,510
Patented Feb. 26, 1957

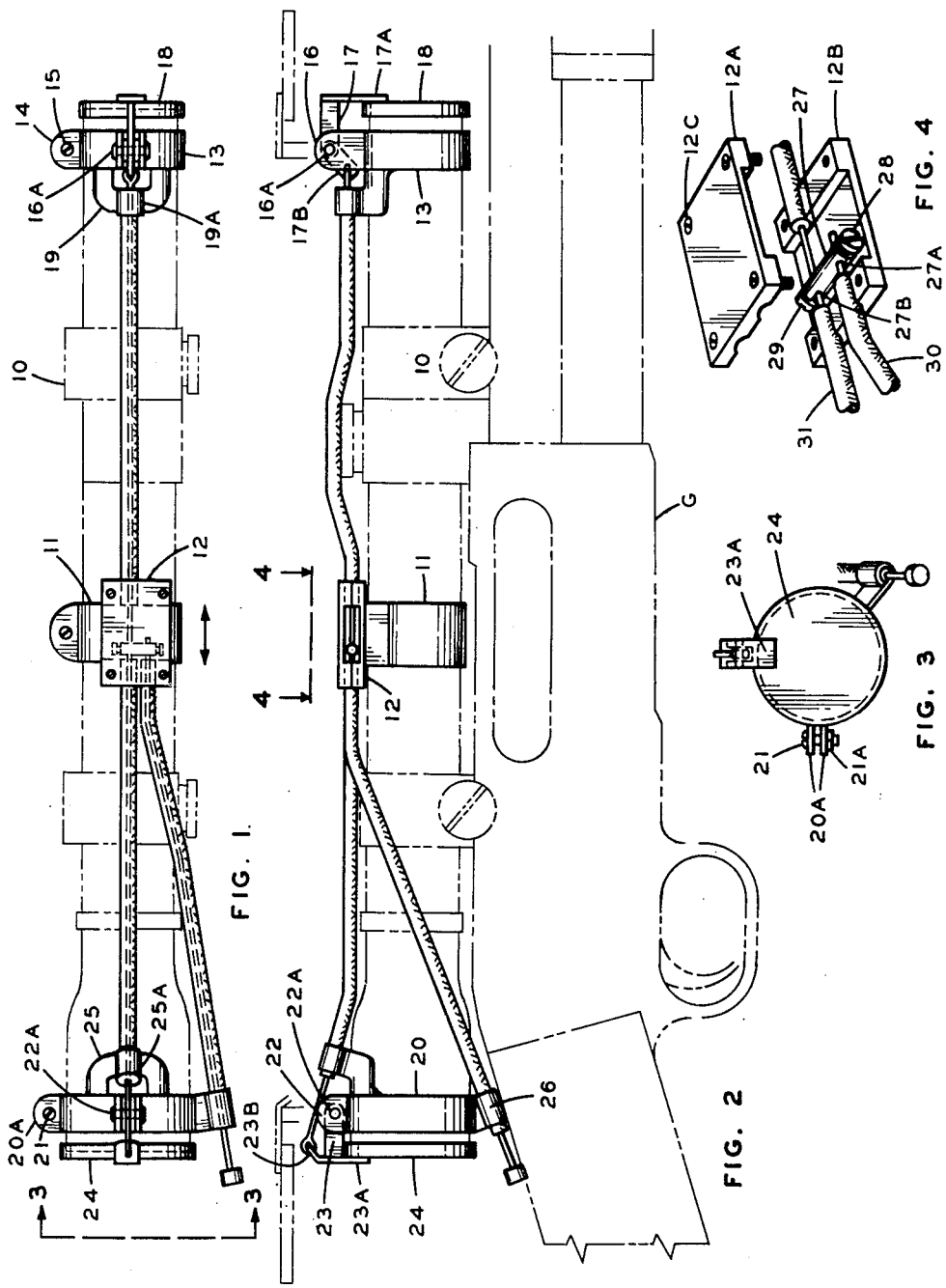

2,782,510

SCOPE SIGHT LENS PROTECTORS

Edward F. Kramm, Alpena, Mich.

Application July 30, 1956, Serial No. 600,912

1 Claim. (Cl. 33—50)

This invention relates to a scope sight lens protector designed for covering and protecting the lens of a scope sight used on hunting guns, when not in use.

The object of this invention therefore is to provide a simple and efficient device for this purpose.

Fig. 1 is a top plan view of the invention as mounted upon a conventional scope sight, the latter being indicated in dotted lines.

Fig. 2 is a side view of the invention as mounted upon a conventional scope sight which is in turn mounted upon a conventional gun, said gun being indicated in dotted lines.

Fig. 3 is a rear end view of an element of the invention as indicated by line 3—3 of Fig. 1.

Fig. 4 is a perspective view of another element of the invention as indicated by line 4—4 of Fig. 2.

As shown in the drawing, the conventional scope sight 10, as mounted upon a conventional gun G, carries a circular support band 11, upon which is mounted a rectangular housing 12, said housing comprising two rectangular halves 12A and 12B, as shown in Fig. 4, and adapted to fit closely together by means of screws 12C. A circular band 13 is mounted on the forward end of the scope sight 10, and is parted at the upper side, and the ends of the band thereat are turned outwardly to form ears 14 through which is freely passed a threaded bolt 15 passed through a nut 15A, whereby the band may be adjustably secured upon the forward end of the scope sight 10. A similar pair of ears 16 are anchored upon the upper side of said band 13 and carries the pivot pin 16A, upon which is pivotally mounted a forwardly extended angular lens supporting bracket 17, the downwardly extended leg 17A of which carries the lens cover 18, the inner side of which is lined with a felt material, not shown.

Extended from the pivoted rear end of the bracket 17 is the downwardly extended trigger 17B. Extended rearwardly from the upper side of the band 13 is an angular cable supporting bracket 19, the upturned legs of which are formed as a sleeve 19A. A similar band 20 is mounted at the rear end of the scope sight 10, and is parted at the upper side, and the ends of the band thereat are turned outwardly to form ears 20A, through which is freely passed a threaded bolt 21, passed through a nut 21A, whereby the band may be adjustably secured upon the rearward end of the scope sight 10. A similar pair of ears 22 are anchored upon the upper side of said band 20 and carries the pivot pin 22A, upon which is pivotally mounted a rearwardly extended angular lens supporting bracket 23, the downwardly extended leg 23A of which carries the rear lens cover 24, the inner side of which is similarly lined with a felt material, not shown. A cable engaging loop 23B extends upwardly for engaging a cable. Extended forwardly from the upper side of the band 20 is an angular cable supporting bracket 25, the upturned legs of which are formed as a sleeve 25A. Extending obliquely downward from the under side of the band 20 is a cable engaging sleeve 26. Transversely and slidably positioned within the housing 12 is an elongated cable clamp 27, provided at its ends with the cable locking screws 28 and 29. A manually operated cable 30 is passed through the sleeve 26 of the band 20 and extends obliquely upward and forward into the housing 12, into a slot 27A of the clamp 27 and firmly secured therein by the screw 28. A similar lens operating cable 31 is extended at its rear end through the sleeve 25A of the bracket 25 and is secured to the loop 23B of the rearward lens supporting bracket 23. The lens operating cable 31 passes through the slot 27B of the clamp 27 and is firmly secured therein by means of the screw 29, and the forward end of this cable passes through the sleeve 19A of bracket 19 and is secured to the lower end of the trigger 17B of the lens supporting bracket 17.

In use the described mechanism is operated as follows:

Assuming the lens covers 18 and 24 are in a closed position upon the lens of the scope sight, as shown in Figs. 1 and 2, said covers are raised horizontally, as indicated in broken lines of Fig. 2, by pushing the manually operated cable 30 forward, thus pushing the cable clamp 27 forward, thereby pulling the rear end of the operating cable 31, and pushing the forward end of the operating cable 31 forward, thus raising the lens covers 18 and 24 horizontally. For closing the said lens covers, the manually operated cable is pulled backward.

I claim:

A scope sight lens protector as described, for protecting the lens of a conventional scope sight as mounted upon a conventional gun, the same comprising three circular bands for mounting medially and at the ends of the scope sight, a housing mounted upon the medial band, a clamp slidably positioned within said housing, said clamp being formed with bores through its ends, angular members pivotally connected to upper sides of the circular end bands of the scope sight, lens covers mounted on said angular members, cable supporting brackets formed with cable sleeve mounted at the upper inner faces of said circular end bands, a cable supporting bracket formed with a cable sleeve at the lower side of the rear circular band, a manually operated cable passed through said sleeve extended forwardly and anchored within a slot at one end of the clamp as slidably mounted within said housing as supported upon said medial band; a lens cover operating cable passed medially through and anchored within a slot at the opposite end of the clamp slidable within said housing, the ends of said cable being passed slidably through the sleeves of the angular brackets of the said end bands and connected at their ends to the lens cover supporting angular members.

No references cited.